(12) United States Patent
Mundada et al.

(10) Patent No.: US 8,549,329 B2
(45) Date of Patent: Oct. 1, 2013

(54) SYSTEM POWER MANAGEMENT USING MEMORY THROTTLE SIGNAL

(75) Inventors: Gopal Mundada, Olympia, WA (US); Xiuting (Kaleen) Man, Portland, OR (US); Brian Griffith, Auburn, WA (US); Viktor D. Vogman, Olympia, WA (US); Richard Kaltenbach, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 724 days.

(21) Appl. No.: 12/347,350

(22) Filed: Dec. 31, 2008

(65) Prior Publication Data

US 2010/0169690 A1 Jul. 1, 2010

(51) Int. Cl.
*G06F 1/32* (2006.01)

(52) U.S. Cl.
USPC ............ 713/300; 713/320; 713/322; 713/600

(58) Field of Classification Search
USPC .......................... 713/300, 320, 322, 324, 600
See application file for complete search history.

(56) References Cited

U.S. PATENT DOCUMENTS

| 7,064,994 | B1 * | 6/2006 | Wu ................................ 365/211 |
| 7,337,339 | B1 * | 2/2008 | Choquette et al. ............ 713/320 |
| 2006/0248355 | A1 * | 11/2006 | Thayer ......................... 713/300 |
| 2007/0079152 | A1 * | 4/2007 | Winick et al. ................. 713/300 |
| 2008/0307238 | A1 * | 12/2008 | Bieswanger et al. ......... 713/300 |

* cited by examiner

*Primary Examiner* — Paul Yanchus, III
(74) *Attorney, Agent, or Firm* — Buckley, Maschoff & Talwalkar LLC

(57) ABSTRACT

According to some embodiments, power information associated with a computing system may be monitored. Based on the monitored power information, it may be determined whether a hardware memory throttling signal will be asserted and/or that a processor power control signal will be asserted.

11 Claims, 3 Drawing Sheets

SYSTEM POWER MANAGEMENT USING MEMORY THROTTLE SIGNAL

BACKGROUND

Components in a computing system, such as a Central Processing Unit ("CPU") and one or more memory subsystem components, may consume power and generate heat as they operate. Moreover, a computing system will typically have limitations associated with how much power and/or heat should be generated during operation. For example, a computing system might have an overall power and/or thermal budget as well as component level power limitations. Note that exceeding these parameters might result in degraded performance and/or damage to components in the system. Further note that one or more power supplies may be used to provide power for the computing system.

In some cases, the computing system may be able to be configured in a number of different ways. For example, in one configuration a computing system might have two processors and four memory subsystems, while in another configuration the same system might have four processors and eight memory subsystems. The number of power supplies, and/or an amount of power available from each power supply, might be selected in view of these potential configurations of the computing system. Note, however, that selecting power supplies based on a maximum or "worst case" system configuration may lead to higher costs and/or lead to reduced power efficiencies.

DETAILED DESCRIPTION

A computing system may include a number of components, such as one or more processors (e.g., CPUs) and memory subsystems. Moreover, the computing system may support different configurations associated with different numbers and/or types of components. For example, in one configuration a computing system might have two processors and four memory subsystems, while in another configuration the same system might have four processors and eight memory subsystems. The number of power supplies, and/or an amount of power available from each power supply, might be selected in view of these potential configurations of the computing system. Note, however, that selecting power supplies based on a maximum or "worst case" system configuration might lead to higher costs and/or lead to reduced power efficiencies.

Figure 1:
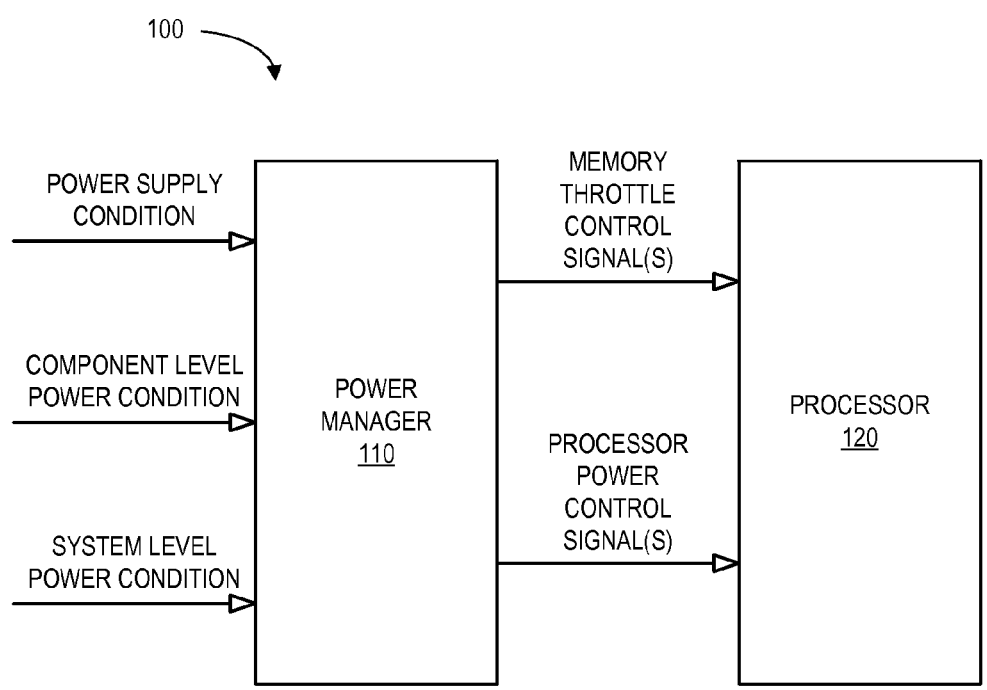
FIG. 1 is a block diagram of a system according to some embodiments.

To avoid such disadvantages, FIG. 1 is a block diagram of a system 100 according to some embodiments. The system 100 includes a power manager 110 adapted to provide one or more memory throttling signals associated with a memory element. Note that the memory throttling signal might not be directly attached to the memory element but might, instead, control operation of the memory element via a processor 120. For example, a hardware memory throttling pin assertion might cause a memory controller to force no-operation ("NOP") frames and reduce power consumption by a memory subsystem. Further note that although a single processor 120 is illustrated in FIG. 1, the system 100 may be associated with any number of processors.

According to some embodiments, the power manager 110 is adapted to monitor power information associated with a computing system. The power manager 110 may be, according to some embodiments, associated with a reconfigurable digital circuit such as a Programmable Logic Device ("PLD") element. The power information and/or conditions received by the power manager 110 might include, for example, power supply information, component power consumption information, and/or an indication of whether a system power utilization level exceeds a pre-determined limit. Based on the monitored power information, the power manager 110 may further be adapted to determine whether (or not) a signal will be asserted on a memory throttling pin.

According to some embodiments, the power manager 110 is also coupled to a processor power control signal input of the processor 120 (e.g., a pin associated with processor and/or CPU power throttling). In this case, the power manager might 110 be further adapted to, based on the monitored power information, determine whether a signal will be asserted on a processor power control pin.

Figure 2:
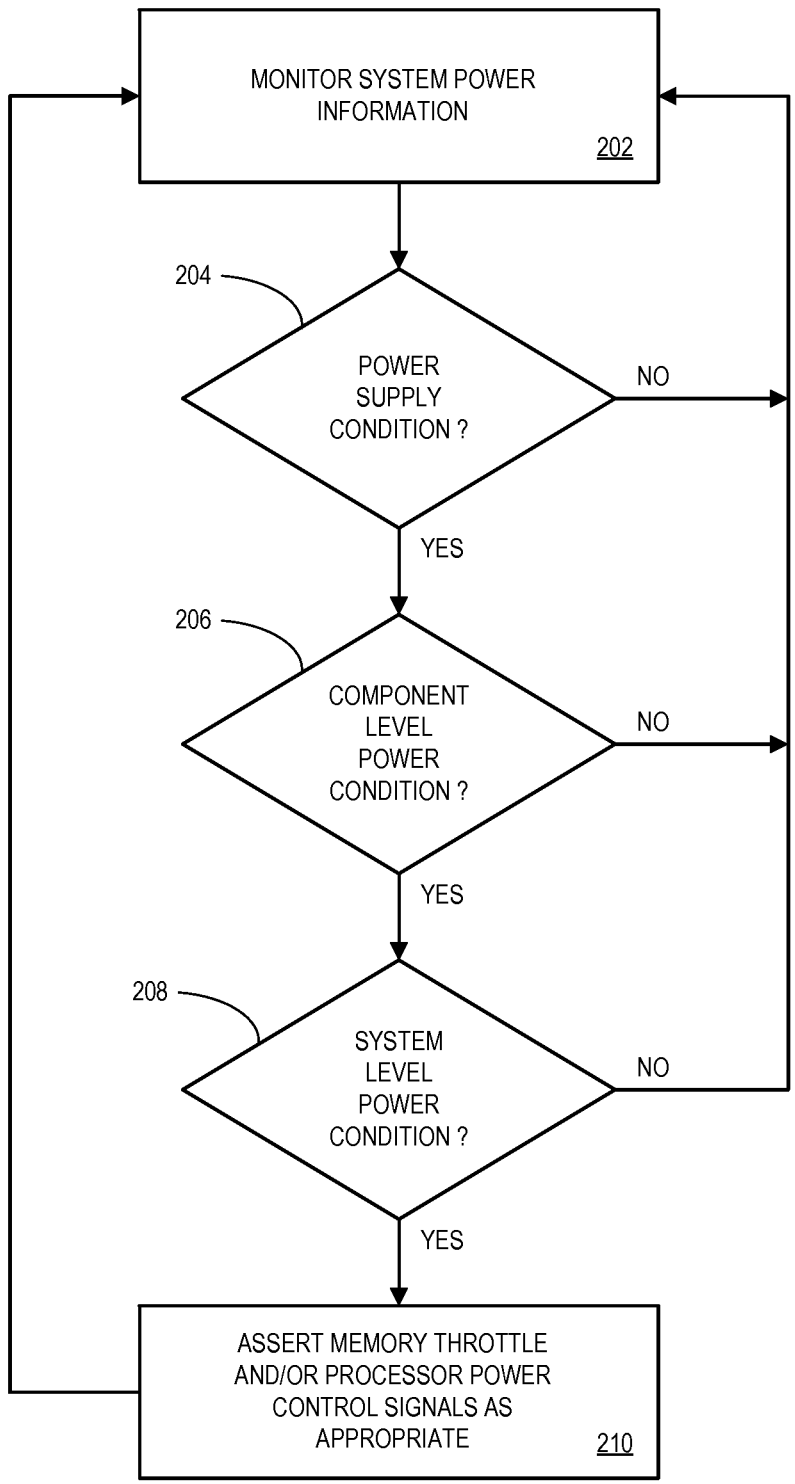
FIG. 2 is a flow chart of a method associated with system power management in accordance with some embodiments.

Thus, the power manager 110 may use the monitored information to facilitate an efficient management of power within the system 100. For example, FIG. 2 is a flow chart of a method that might be associated with the power manager 110 in accordance with some embodiments. The flow charts described herein do not necessarily imply a fixed order to the actions, and embodiments may be performed in any order that is practicable. Note that any of the methods described herein may be performed by hardware, software (including lower level code, such as microcode), or a combination of hardware and software. For example, a storage medium may store thereon instructions that when executed by a machine result in performance according to any of the embodiments described herein.

At 202, power information associated with a computing system may be monitored. It may then be determined whether or not one or more power supply conditions exist at 204. The power supply conditions might be associated with, for example: (i) power supply information, (ii) an indication of whether one or more power supplies are installed, (ii) an indication of whether at least one power supply has failed, (iv) an indication of whether at least one power supply is exceeding a design/maximum continuous power limit, (v) an indication of whether one or more power supply input voltage/AC range has failed and/or (vi) a System Management Bus ("SM-Bus") signal. If the power supply conditions do not exist at 204, the method continues monitoring the system power information at 202.

It may then be determined whether or not one or more component level conditions exist at 206. The determination might be performed, for example, dynamically (e.g., as conditions change) and/or automatically (e.g., without intervention by a user). The component level conditions might be associated with, for example: (i) component power consumption information, (ii) an indication that a processor voltage regulator current trip point has been triggered, and/or (iii) an indication that a memory voltage regulator current trip point has been triggered. If the component level conditions do not exist at 206, the method continues monitoring the system power information at 202.

It may then be determined whether or not one or more system level power conditions exist at 208. The system level power conditions might include, for example, an indication of whether an overall system power utilization level exceeds a pre-determined limit. If the system level power conditions do not exist at 208, the method continues monitoring the system power information at 202. Note that there might be multiple system power utilization levels (e.g., associated with different actions to be taken) according to some embodiments.

At 210, a hardware memory throttling signal connected to a memory controller (external or integrated on a processor socket) pin and/or a power control signal connected to a processor may be asserted. According to some embodiments, the computing system may be associated with a plurality of memory components, in which case more than one hardware memory throttling signals might be asserted at 21 0. Similarly, the computing system might be associated with a plurality of processors, in which case more than one processor power control signals might be asserted at 210.

After the memory throttle and/or processor power control signals are asserted at 210, the method continues to monitor system power information at 202. Moreover, based on the continued monitoring of the power information, it may later be determined that the hardware memory throttling signal(s) and/or processor power control signal(s) will no longer be asserted. Note that as the amount of power consumed by a system (or a component within the system) increases, the amount of heat generated by the system (or the component within the system) will typically also increase. That is, power and thermal considerations may go hand-in-hand in connection with computing systems and/or subsystems. As a result, embodiments described herein as being associated with a "power management" or "power throttling" also encompass the notion of "thermal/heat management" or "thermal/heat throttling."

Figure 3:
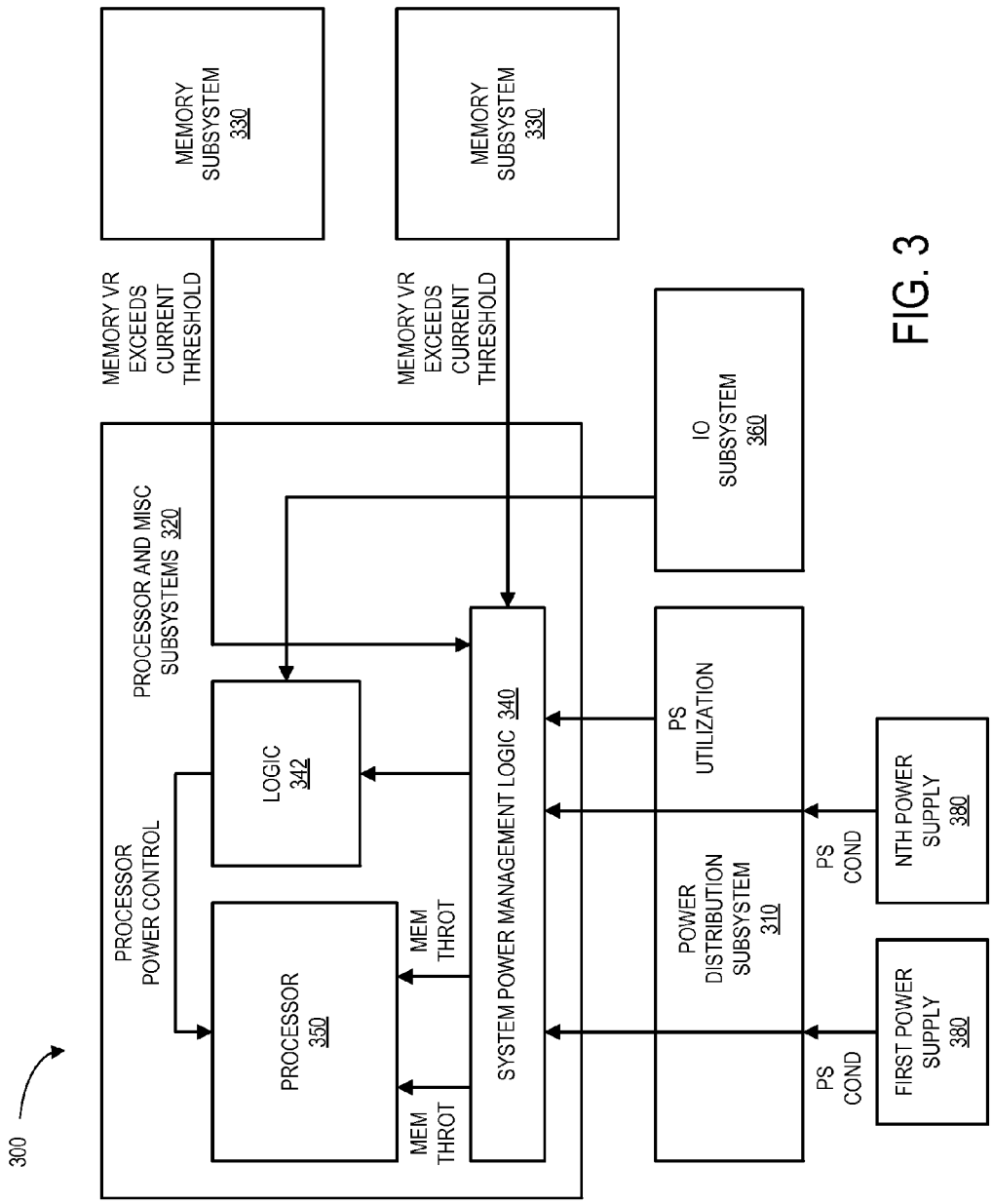
FIG. 3 is an example of a system according to some embodiments.

FIG. 3 is an example of a system 300 according to some embodiments. In particular, the system 300 includes a power distribution subsystem 310 (e.g., associated with a power distribution board) that supplies power to a processor and miscellaneous subsystem element 320 (e.g., associated with a baseboard). The system also includes a number of memory subsystems 330 (e.g., associated with memory risers), system power management logic 340 (e.g., associated with baseboard glue logic as well as additional logic 342), a processor 350, an Input Output ("IO") subsystem 360 (e.g., associated with an IO riser), and a number of power supplies 380 (e.g., a first power supply through an Nth power supply). Note that the system 300 might be adapted to support any number of different configurations, including configurations with different numbers of processors 350, memory subsystems 330 (and associated memory elements), and/or power supplies 380.

The power supplies 380 and/or power distribution subsystem 310 might be selected and/or designed using a "full sized" approach (to fully support even the maximum system 300 configuration) or a "limited supply" approach (which would only supported limited system 300 configurations). Moreover, sizing the power supplies 380 for the worst case power consumption possibility might require higher wattage power supply (and thus higher system power costs). Similarly, such an approach may lead to higher cooling costs for the system. On the other hand, if the power supplies 380 do not support the maximum (e.g., worst case) configuration continuously, then the system configuration and/or usage might exceed the power capacity (and the entire system 300 may shutdown, via over current protection or over temperature protection mechanisms within the power supplies 380 or some other mechanisms or reasons). Such a result may be unacceptable for many applications (e.g., volume and high-end server products).

By way of example only, the system 300 might support up to 64× quad-rank Double Data Rate ("DDR") Dual Inline Memory Modules ("DIMMs"), causing a significant portion of the system 300 power to be consumed by memory subsystems (e.g., 60% of system power might be consumed by memory subsystems). Similarly, if four processors are included in the system, 20% or more of system power could be consumed by processors.

According to some embodiments described herein, system power management logic may actively manage various power levels and risks by monitoring power supply status, system power utilization, and/or Voltage Regulator ("VR") currents associated with processor and/or memory elements. Moreover, the system power management logic may appropriately drive memory and/or processor powers reductions to avoid a system shutdown scenario. For example, system power management logic might use one or more memory throttle pins on an integrated Memory Controller ("iMC") within the processor 350 silicon (along with system power management logic 340) to improve the operation of the power supplies 380 with respect to mainstream configurations. Some embodiments may also reduce power requirements (e.g., helping to reduce system power/cooling cost as well as improving power supply efficiency).

Some embodiments include a memory controller that has a power control capability via an external hardware interface ("MEM THROT" in FIG. 3). For example, the hardware interface may reduce memory subsystem power by initiating memory throttling by asserting the MEM THROT signal. Moreover, some embodiments may include one or more processors that have a power control capability via an external hardware interface. By way of example, a processor with an integrated memory controller might have both memory throttle pins and a processor power control pin. The assertion of processor power control pin may cause the processor's core and/or cache power consumption to be reduced. The assertion of the memory throttle pin might, for example, cause the memory controller to force NOP frames to an interface that is connected to DIMM(s) and/or memory subsystem (s). Asserting these NOP frames reduce power consumption of memory subsystems. Note that such a memory throttle pin might be independent of thermal throttling, may have only a minimal delay between a time the memory throttle pin (power reduction request/alert) is asserted to the time memory subsystem power is reduced.

The system power management logic 340, such as a PLD, might, according to some embodiments, assert memory throttle signals (e.g., pins) only when all of the following three conditions are detected:

1) Either, all power supplies 380 are not installed in the system 300, or at least one power supply 380 has failed (even though all the power supplies 380 are installed), or any power supply 380 signals that its output has exceeded a continuous power design limit.

2) One or more processor/memory VR current/power trip points are triggered. According to some embodiments, this condition might be satisfied if any trip point is triggered (and in other embodiments, multiple trip points may need to be triggered).

3) System power utilization is currently too high (e.g., it exceeds a pre-set limit). Note that embodiments may be associated with any one (or combination) of the above conditions and/or other conditions. Further note that the system power management logic 340 might also assert one or more processor power control signals (e.g., to reduce processor power consumption under the three conditions mentioned above or when processor power consumptions exceed power delivery subsystem design limits).

According to some embodiments, the system 300 will not assert any memory throttling pins or processor power control pins if power consumption for the complete system 300 is within appropriate power delivery limits. This may help ensure that memory throttling and processor power control pins are asserted only when necessary (and thus the system 300 performance might not be sacrificed unless the system power demand exceeds available power capacity). Further note that embodiments might include the ability to separately assert, for example, three input signals (at two memory throttle pins and one processor power control pin) on a processor socket (thereby individually controlling each memory controller and the processor core subsystem power). For example, if one memory subsystem 330 is installed with high-power DIMMs and a current threshold trigger is tripped, power reduction might only be done with respect to that memory subsystem 330 (e.g., the other memory subsystem 330 and processor core power would not be impacted).

The power supply condition ("PS COND" in FIG. 3) transmitted from the power supplies 380 to the system power management logic 340 might instead be associated with, in some embodiments, a power supply SMBus ALERT signal. Note in some embodiments, additional logic 342 and/or Basic Input Output System ("BIOS") and/or firmware might be used to manage power for the system 300.

According to some embodiments logic in the processor and miscellaneous subsystem element 320 (e.g., associated with a motherboard) may assert one or more processor memory throttle pins when: (1) memory/processor VR current exceeds a trip point, (2) power supply utilization exceeds a pre-set threshold, and/or (3) there are a reduced number power supplies 380 in the system 300. That is, hardware logic may assert memory throttle pins when the system power demand is higher than what the power supplies 380 can deliver. There may also be a mechanism for reducing processor 350 power by asserting a processor power consumption control pin. Note that the assertion of the memory throttle pin may cause a memory controller to force NOP frames thus reducing memory subsystem power. This may reduce the system 300 performance in order to achieve power reduction only when less than a sufficient number of functional power supplies 380 are installed in the system 300 and the system 300 power requirements are higher than supported by the functional power supplies 380. This might not, however, sacrifice system 300 performance for a fully configured processor/memory/IO system when all power supplies 380 are installed and functional.

Thus, according to some embodiments, system 300 performance might not be sacrificed under a full system configuration when all power supplies 380 are installed (and functional), but may be sacrificed upon power supply 380 failure or when the system 300 power demand gets close to (or exceeds) the power supported by the power supplies 380. As a result, a reduction of system 300 power and/or cooling costs without sacrificing performance under full power supply 380 configuration may be achieved. Moreover, some embodiments let the system 300 support fewer redundant power supplies 380 (and, in so doing, perhaps save power). Note that lower wattage power supplies 380 may run more efficiently when the system 300 is in an idle state. Such an approach may also reduce the cost of the system 300 by allowing for a lower wattage power supplies 380.

By way of example only, consider a system with a 4-socket 64× quad-rank DIMM configuration. Such a system might need, for example, approximately a 2200 watt power supply while a 32× dual-rank DIMM configuration might need a 1400 watt power supply. Moreover, note that a QR ×4 DIMM might not have significant pricing benefits up to 256 GB (e.g., 64 DIMMs using a 4 GB DIMM stick). On the other hand, QR ×4 might provide lower DIMM pricing for 512 GB—and significantly lower DIMM pricing for 1024 GB. Further note that only a relatively small portion of customers (e.g., 5%) might install more than 256 GB of memory in 4-socket system.

This type of server system may typically be configured with redundant power supplies. According to some embodiments described herein, the system might improve power supply management for mainstream configurations, and yet still support a maximum system configuration (without sacrificing performance when all power supplies are installed and fully functional). For example, if the power supply for this system is sized for 32× dual-rank DIMMs (e.g., a mainstream configuration), then the total power requirement per power supply is 1400 W. As a result, a single low wattage/low cost power supply could support the mainstream configuration (as well as improve power supply efficiency as the system will be mostly running above 50% load). If the power supply is designed to supported 64× quad-rank DIMMs (e.g., needing 2200 watts), then a typical load will likely be less than 50% (reducing power supply efficiency).

When a 1400 W power supply (designed for a mainstream configuration) is used in a redundant configuration (e.g., two such power supplies are provided in the system), then the total available power may be able to support a full system configuration, including quad-rank 64 DIMMs, without sacrificing performance. If any one of the power supplies fails in such a fully loaded configuration, the system power management logic according to some embodiments described herein may start throttling one or more memory (and/or processor) subsystems. The throttling may reduce system power requirements, and thus prevent the system from reaching a shutdown situation.

To prevent the power supply (and the system) from shutting down when a system is fully populated—but one of the two power supplies has failed—power supply current limit hardware may be configured to support a peak power level equal to (or exceeding) an amount of power consumed in that configuration. This peak power level support might be provided, for example, during a limited period of time associated with how long it takes to throttle memory (and/or processor) subsystems and reduce system power requirements. As a result, a power supply thermal design current (power) rating may remain unchanged. If the peak current limits are exceeded (e.g., due to a failure on system side), the power supply may protect itself as would occur in a typical system.

This sacrifice of performance for a short period of time during a failure (e.g., a power supply or AC line failure) may be acceptable in many situations, as the approach delivers improved cost/power benefits under normal configurations. Moreover, some embodiments provide such benefits using simple board hardware logic and memory throttle signals on a processor reduce power requirements relatively quickly. Note that a system implementation might also use BIOS instructions, firmware, and/or other software mechanisms to trigger the memory throttling event and reduce system power. Further note that a software mechanism might be associated with a longer response time (and may be slightly more complicated as compared to a simple hardware mechanism).

The above example illustrates how a power supply might be optimized for some mainstream configurations, such as a 32× dual-rank DIMMs, and still support full system configurations, like 64× quad-rank DIMMs, under a redundant power supply configuration by using system power management mechanisms according to some of the embodiments described herein. In addition to power supply cost savings, there might be other benefits according to some embodiment (e.g., system/power cooling cost savings or lower utility bills due to better system efficiencies).

Thus, embodiments described herein may provide systems and methods to efficiently provide power management using one or more memory throttle signals or pins (and/or, similarly, processor throttle signals). Moreover, according to some embodiments, hardware reliable protection may be provided to limit power consumptions within an available power capacity. Such an approach may reduce system power requirements (by improving the power supply for mainstream system configurations while still supporting more demanding system configurations) using system protection mechanisms/power management features to lower power and/or thermal cost (without sacrificing performance under full power supply configurations). In addition, power supply efficiency may be improved (without adding cost) when typical system power consumption stays above 50%. Moreover, some embodiments may provide improved power dropout ride through techniques by load shedding during a momentary power outage or under-voltage condition. The memory and/or CPU throttling mechanisms described herein may be asserted when the power supply detects a disruption to AC power (and thereby reducing the power consumed and extending the discharge rate of capacitance within the power supply).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although some embodiments have been described with respect to particular types of components and system configurations, any other types of components and/or system configurations may be used instead. For example, embodiments might be associated with blade server system, High Performance Computing ("HPC") devices, and/or two-socket server systems. Moreover, other implementations and variations may be provided for the power management logic and algorithms described herein. Moreover, note that any of the embodiments described herein might further be associated with thermal inputs (e.g., in addition to or instead of power inputs) and/or thermal management of the system. Further, note that embodiments may be associated with hardware pin-based and similar memory throttle features supported on any memory subsystem component.

The several embodiments described herein are solely for the purpose of illustration. Persons skilled in the art will recognize from this description other embodiments may be practiced with modifications and alterations limited only by the claims.

What is claimed is:

1. A method, comprising:
monitoring power information associated with a computing system; and
based on the monitored power information, determining whether (i) a first hardware memory throttling signal will be asserted at a first memory throttle pin on a processor socket, (ii) a second hardware memory throttling signal will be asserted at a second memory throttle pin on the processor socket, and (iii) a processor throttling signal will be asserted at a processor power control pin on the processor socket;
wherein at least one of the two memory throttling signals is asserted only when both: (i) a memory voltage regulator current trip point is triggered and (ii) a system power utilization exceeds a pre-set limit and wherein the computing system includes a plurality of processors, and said determining comprising:
based on the monitored power information, determining whether a hardware processor power control signal will be individually asserted for each of the plurality of processors.

2. The method of claim 1, wherein the power information includes all of: (i) power supply information, (ii) an indication of whether one or more power supplies are installed, (ii) an indication of whether at least one power supply has failed, (iv) an indication of whether at least one power supply is exceeding a design/maximum continuous power limit, (v) an indication of whether one or more power supply input voltage/AC range has failed, and (vi) a system management bus signal.

3. The method of claim 2, wherein the power information includes all of: (i) component power consumption information, (ii) an indication that a processor voltage regulator current trip point has been triggered, and (iii) an the indication that the memory voltage regulator current trip point has been triggered.

4. The method of claim 3, wherein the power information includes indications of: (i) whether a system power utilization level exceeds a pre-determined limit, and (ii) whether multiple system power utilization levels exceed a pre-determined limit.

5. The method of claim 1, wherein said determining is performed by a programmable logic device or discrete logic components on a board.

6. The method of claim 1, wherein: (i) the first hardware memory throttling signal causes a first memory controller to force no-operation frames and reduce power consumption by a first memory subsystem, and (ii) the second hardware memory throttling signal causes a second memory controller to force no-operation frames and reduce power consumption by a second memory subsystem.

7. The method of claim 1, further comprising:
asserting the first hardware memory throttling signal without asserting the second hardware memory throttling signal.

8. The method of claim 7, further comprising:
continuing to monitor power information associated with the computing system; and
based on the continued monitoring of the power information, determining that the first hardware memory throttling signal will no longer be asserted.

9. A system, comprising:
a first memory throttling pin input on a processor socket associated with a first memory element;
a second memory throttling pin input on the processor socket associated with a second memory element;
a processor power control pin on the processor socket; and
a power manager coupled to the memory throttling pin and adapted to: (i) monitor power information associated with a computing system, and (ii) based on the monitored power information, determine whether a signal will be asserted on the first and second memory throttling pins;
wherein the signal is asserted on least one of the two memory throttling pins only when both: (i) a memory voltage regulator current trip point is triggered and (ii) a system power utilization exceeds a pre-set limit and wherein the system includes a plurality of processors, and said determining comprising:

based on the monitored power information, determining whether a hardware processor power control signal will be individually asserted for each of the plurality of processors.

10. The system of claim 9, wherein the power information includes all of (i) power supply information, (ii) component power consumption information, and (iii) an indication of whether a system power utilization level exceeds a pre-determined limit.

11. The system of claim 9, wherein the power manager is associated with a programmable logic device or discrete logic components on a board.

* * * * *